Figure 1:
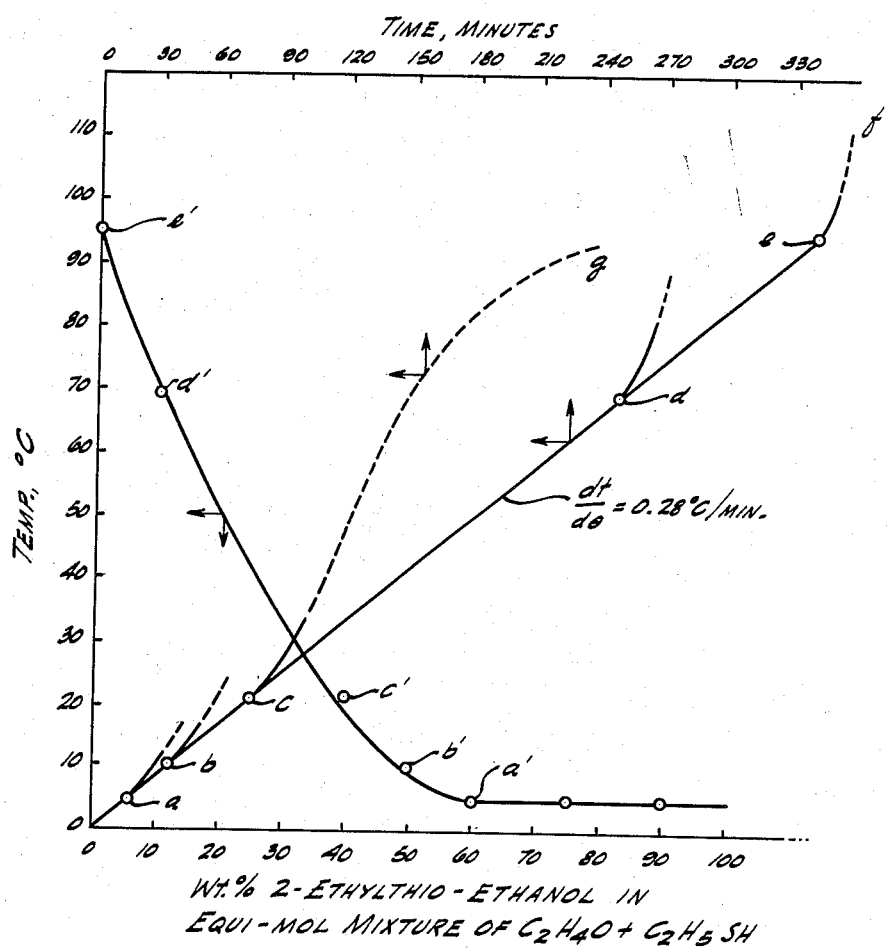

Jan. 8, 1957 T. F. DOUMANI 2,776,997
PREPARATION OF HYDROXY THIO-ETHERS
Filed Jan. 30, 1953 2 Sheets-Sheet 1

INVENTOR.
THOMAS F. DOUMANI,
BY
Lannus S. Henderson
AGENT.

United States Patent Office 2,776,997
Patented Jan. 8, 1957

2,776,997

PREPARATION OF HYDROXY THIO-ETHERS

Thomas F. Doumani, Whittier, Calif., assignor to Union Oil Company of California, Los Angeles, Calif., a corporation of California Application January 30, 1953, Serial No. 334,234

14 Claims. (Cl. 260—609)

This invention relates to improvements in the preparation of hydroxy thio-ethers by the interaction of alkylene oxides with organic thiols according to the general equation:

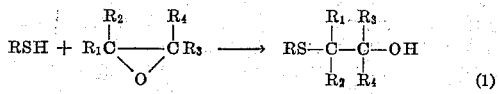

(1)

where R is any non-interfering organic radical, and $R_1$, $R_2$, $R_3$ and $R_4$ may be hydrogen or any non-interfering organic radical. The process is particularly applicable to the preparation of 2-ethyl mercapto-ethanol from ethylene oxide and ethyl mercaptan as follows:

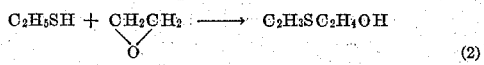

(2)

This material, as well as some of its homologs and analogs, have been found useful as solvents and chemical intermediates for the production of resins, rubbers, plastics, and in particular as intermediates for a class of newly developed systemic insecticides disclosed in U. S. Patent No. 2,571,989.

It is an object of this invention to provide conditions whereby substantially theoretical yields of hydroxy thio-ethers may be obtained by the direct interaction of alkylene oxides and mercaptans in liquid phase without danger of explosion, and without undesirable side-reactions.

Another object is to provide methods whereby the temperature of the reaction may be easily controlled.

Still another object is to eliminate the need for an extraneous catalyst in the process.

A more specific object is to provide economical continuous methods for carrying out the reaction, which methods may be either adiabatic or non-adiabatic.

Other objects will be apparent to those skilled in the art from the description which follows.

The general reactions set forth in Equations 1 and 2 above are well known, but the carrying out of those reactions has in the past been accompanied by considerable difficulties. The reaction is exothermic, and in the absence of a catalyst proceeds very slowly, if at all, until the temperature is raised to between 70 and 95° C. at which point the temperature rise becomes very rapid and uncontrollable. This may result in a considerable explosion hazard, particularly if a normally gaseous reactant such as ethylene oxide is employed.

The reaction may be initiated at lower temperatures by employing catalysts, e. g. potassium hydroxide in 80% ethanol (J. Chem. Soc., 1949, 273) or sodium methylate and sodium mercaptides (Olin, U. S. P. 2,494,610). The use of extraneous catalysts however involves an added expense as well as additional separation problems. Moreover, the problem of temperature control still exists, since the exothermic heat of reaction rapidly heats the reactants plus the small amount of catalyst to a dangerously high level.

High temperatures are not only dangerous from the standpoint of explosion hazard, but are disadvantageous in that they promote undesirable side-reactions. As a result of these side reactions, a variety of objectionable contaminants may be formed comprising polymers of the alkylene oxide with the mercaptan, as well as dehydration products of the hydroxy thio-ether which is primarily formed. One of the most objectionable contaminants is the class of compounds known as olefine sulfides which are formed principally by dehydration as follows:

These sulfides tend to polymerize to high boiling products during the processing.

The present invention is based upon the discovery that the reactions set forth in Equations 1 and 2 are autocatalytic in nature, i. e. that they are catalyzed by the reaction product itself, or by other hydroxy thio-ethers. The significance of this discovery may be more readily appreciated by referring to the attached Figure I. In this figure, the line a—b—c—d—e represents a constant incremental heat input into the reaction mixture resulting in a temperature rise amounting to 0.28° C. per minute. If the reaction mixture consists of the pure reactants e. g. an equi-mol mixture of ethyl mercaptan and ethylene oxide, the temperature rise will be almost constant until the point e is reached, whereupon there will be a sharp increase in temperature gradient represented by line e—f. This sharp rise in temperature reflects the non-catalytic initiation of reaction, and as soon as some product is formed the reaction becomes catalytic and its rate, and thus the temperature gradient, rises even more sharply in a virtually uncontrollable manner. When the temperature rises above about 100° C. the undesirable side-reactions mentioned above begin to occur extensively. If, however, the reaction mixture contains 10% by weight of the product 2-ethyl mercapto-ethanol, the exothermic temperature rise begins at the point d, i. e. at about 70° C. It will be immediately apparent that this exothermic rise is more readily controlled inasmuch as there is a 30° margin of safety before undesirable side-reactions begin to occur.

If the reaction mixture contains 40% of 2-ethyl mercapto-ethanol, the exothermic temperature rise begins at about point c, i. e. at 21° C. In this case the sensible heat capacity of the reactants plus the 40 weight percent of product may be sufficient to absorb the exothermic heat without raising the temperature of the mixture above about 100° C. In such a case, the process may most advantageously be operated adiabatically as illustrated by line c—g. Adiabatic operation is generally most economical, but for flexibility of operation and other considerations, it may be desirable to add or subtract heat at various points. Also, it may be advantageous to conduct the reaction continuously in a column or tube which may be air cooled. This is not strictly adiabatic operation, but may be advantageous from the standpoint of flexibility and ease of control.

The points a and b in Figure I represent the temperatures at which reaction mixtures containing respectively 60% and 50% of 2-ethyl mercapto-ethanol begin to show an exothermic temperature rise. Such reaction mixtures may be even more advantageously processed in an adiabatic manner.

The above data shows conclusively that the product of the reaction catalyzes the reaction by lowering the thermal requirements for its initiation, and increasing the reaction rate at all temperatures. It will be noted that the temperature gradient increase at the point of initial exothermic rise is inversely proportional to the proportion of 2-ethyl mercapto-ethanol in the mixture. This is because the reaction rate itself is lower at low temperatures, and also because the increasing proportion of 2-ethyl mercapto-ethanol absorbs more of the heat of reaction.

The line $a'—b'—c'—d'—e'$ in Figure I shows the relationship between the temperature at which an exothermic rise is first observed and the proportion of 2-ethyl mercapto-ethanol in the reaction mixture. This may be termed the exothermic threshold curve, and indicates the effective temperatures for initiating the reaction in mixtures of varying composition.

Although, by the methods described herein, the reaction may be carried out at very low temperatures, e. g. 5–20° C., it is preferable to carry out the bulk of the reaction at higher temperatures, i. e. 20° to 100° C., in order to provide a reasonably rapid rate of reaction. For maximum efficiency and yields, the temperature should not be allowed to rise appreciably above about 100° C., but should be maintained at above about 50° C. for the major part of the residence time of the reactants in the reactor.

In the preferred method of operation, the process is initiated at temperatures below about 70° C. in the presence of catalytically effective proportions of hydroxy thio-ether. Such catalytically effective proportions range between about 10% and 90% by weight of the total reaction mixture. After initiation, the reaction automatically proceeds to completion with evolution of heat. If the concentration of thio-ether in the original mixture is sufficiently high, i. e. between about 40% and 90%, no temperature control or heat transfer means are ordinarily required, the reaction proceeding adiabatically. In some cases, however, as when less than about 40% by weight of thio-ether is present at initiation of the reaction, it may be desirable to remove heat, or to transfer heat from the reaction mixture to the incoming reactants. The latter type of temperature control may be considered adiabatic, since no heat is added or subtracted from the complete system.

The reactor employed should preferably be adapted for continuous operation, although the major process advantages are also obtained in batchwise operation. Figure II illustrates diagrammatically one type of continuous reactor which may be employed. This apparatus may be employed as follows:

The desired alkylene oxide is pumped through line 1 into mixing valve 2 by means of positive displacement pump 3. The desired mercaptan is introduced into line 1 via line 4, by means of pump 5. A recycle stream, which may consist of either alkylene oxide or mercaptan, is admitted into line 1 from recycle line 6. The proportion of fresh and recycle alkylene oxide and mercaptan which enters mixing valve 2 should preferably be about equi-molar. Preferably the reactants should be in the liquid state. From mixing valve 2, the process may be operated by either of two general procedures:

*Procedure 1.*—According to this method the liquid mixture in mixing valve 2 is admitted directly through line 7 into the lower end of a tubular reactor 8. This reactor may be of any conventional size and design, such as a tubular stainless steel vessel from a few inches to a few feet in diameter. The interior is packed with any type of inert solid bodies capable of providing a multitude of tortuous paths for the fluid flow. Suitable packing materials include for example, Raschig rings or glass beads, etc. A heat transfer coil 10 is enclosed within packing 9 to provide suitable heat control if desired. At the beginning of the reaction the reactor 8 is preferably filled, or partially filled, with the desired product, hydroxy thio-ether. This initial charge of thio-ether is for the purpose of initiating the reaction at a low temperature; after the reaction has been initiated, it may be allowed to proceed auto-catalytically to substantial completion in the upper part of the reactor 8.

The reactants, upon entering the bottom of the product-filled reactor at, for example 25° C., immediately establish a concentration gradient of hydroxy thio-ether ranging from 100% at an upper point of the reactor to 0% at a lower point. This concentration gradient of product is found to be automatically maintained if the flow rate of fluid in the reactor is sufficiently slow to permit a substantial degree of mutual diffusion upwardly and downwardly in the column, and if the packing material 9 provides a sufficiently tortuous path so that substantial local mixing by turbulence will occur. If no packing material is employed in reactor 8, turbulent mixing would be substantially decreased and the flow rate of reactants would need to be further diminished in order to provide sufficient time for diffusion to establish a concentration gradient of product in the reactor.

If the flow rate is too rapid to permit diffusion, and if there is insufficient local turbulence in the reactor, the relatively cool reactants will tend to push the reaction front further toward the outlet of the reactor until finally no reaction will occur. It is therefore essential, if there is no re-cycle of the product hydroxy thio-ether with the incoming reactants, to maintain sufficient local turbulence and diffusion within the reactor to permit the establishing of a concentration gradient of the thio-ether over a substantial length of the reactor. By establishing this concentration gradient, as is obvious from the foregoing discussion in connection with Figure 1, the reaction may be initiated in the section of the reactor where the concentration gradient exists at a lower temperature than it could be initiated at the inlet where there is no thio-ether.

In operating by this procedure, wherein no re-cycle product is employed, it may be necessary to utilize temperature control devices. A very suitable temperature control may be maintained by introducing cold water into the upper end of heat transfer coil 10. This water will cool the reaction mixture in the upper part of the reactor and heat the reactants in the lower part of the reactor. By suitably controlling the flow rate of water, it is possible to operate adiabatically, transferring to the lower part of the reactor all the heat taken up from the upper part. In this manner, the water which leaves the lower end of heat transfer coil 10 will be at substantially the same temperature as the inlet water.

*Procedure 2.*—According to a second possible procedure, part of the product hydroxy thio-ether may be recycled through line 11 to mixing valve 2, thereby providing a constant proportion of thio-ether in the reactants entering reactor 8. This may be automatically accomplished, for example, by means of a motor valve 12 operated by a flow controller 13, which in turn is responsive to an orifice plate 14 in line 1. The proportion of thio-ether introduced to mixing valve 2 may vary between about 10% and 90% by weight and preferably between about 40% and 60%. In this procedure the fluid velocity in reactor 8, and the state of turbulence thereof, are not as critical as in the case of Procedure 1. The reaction may be initiated at approximately the exothermic threshold for the particular mixture entering the reactor. These temperatures are shown by line $a'b'c'd'$ in Figure 1. Temperature control after initiation of the reaction is not so critical, but may in some cases be desirable. It may, in fact, be desirable in some cases to add heat to the reactor by passing steam into the lower end of heat exchange coil 10 to heat the reactants to reaction temperature.

In either of the above types of operation the liquid 15, which forms at the top of reactor 8, consists substantially of the desired hydroxy thio-ether. The yields may be substantially theoretical. The crude product is drawn off through line 16 upon the opening of pressure controlled valve 17. The pressure control valve may be desirable only in cases where one or more of the reactants are gaseous or low boiling compounds, such as ethylene oxide or ethyl mercaptan. The crude product in line 16 is then admitted to a distillation column 18, wherein any excess alkylene oxide or mercaptan is distilled off and re-cycled via condenser 19 and line 6 to the reactant inlet line 1.

The bottoms from distillation column 18 consist substantially of the desired product, with very small amounts of high boiling compounds. This material is sufficiently pure for most uses, but may, if desired, be further purified in a second distillation column 20 from which the pure product is taken off through line 21 and the high boiling bottoms through line 22. As shown, and heretofore described, it may be desirable to split the bottoms from distillation column 18 and re-cycle a part thereof through line 11 to mixing valve 2 and take off the remainder through line 23 for final purification as described.

In both of the above-described modifications, it will be apparent that there is a reaction-initiating zone near the inlet end of the reactor, meaning a mixing and heating zone which terminates where the initial exothermic temperature rise is first noted. As indicated above, this zone should preferably be maintained at below about 70° C. and above about 20° C. The downstreamward portion of the reactor may be termed a reaction completion zone, meaning the zone of increasing hydroxy thio-ether concentration. This latter zone should preferably be maintained at a temperature between about 50° and 100° C., as indicated above.

Figure 2:
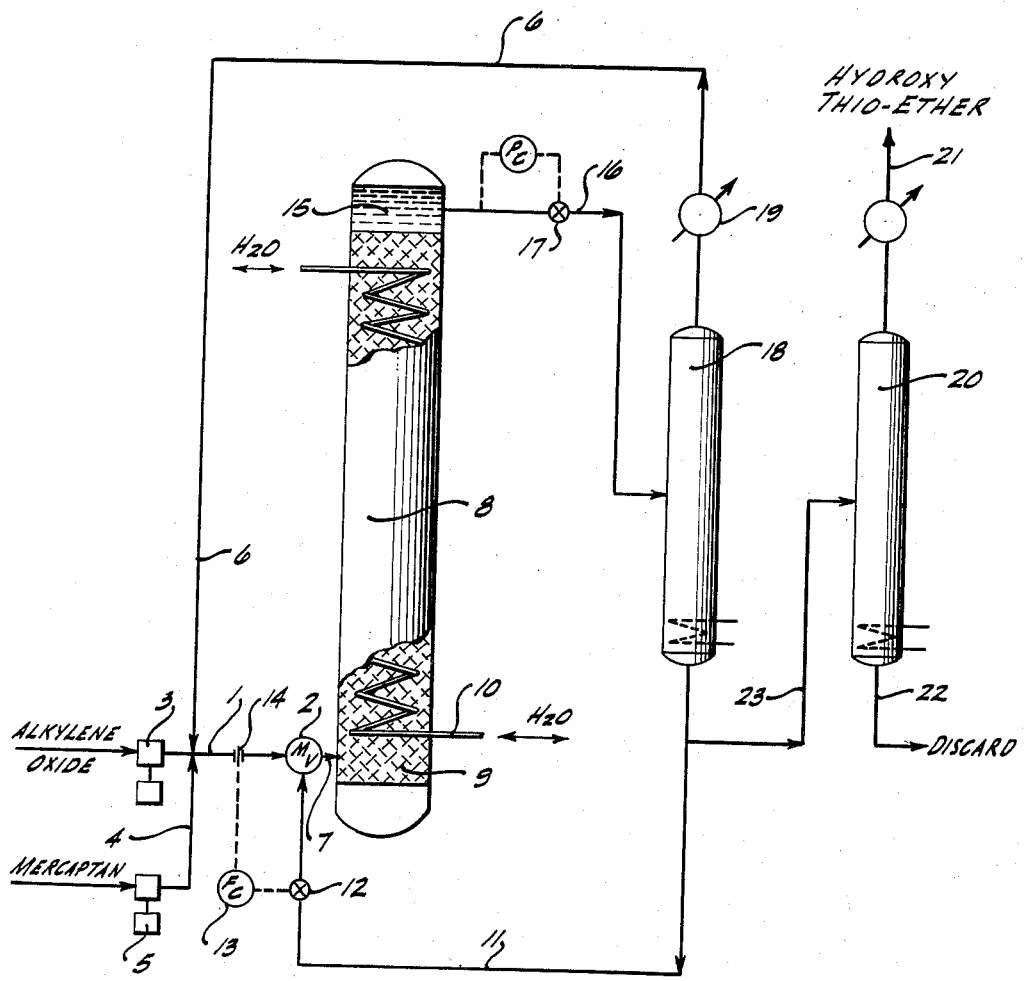

While the attached Figure 2 shows a reactor which consists of a packed column, it will be obvious to those skilled in the art that other forms of reactors may be employed. For example, the reactor may consist of a small tubular coil, ½ to 2 inches in diameter, which is externally heated or cooled. In using a tubular reactor, the flow rates are ordinarily greater than in the case of larger columns, and packing is not ordinarily employed. Therefore, the concentration gradient of product in a small tubular reactor will occur over a shorter distance, and it is hence preferable to re-cycle part of the product.

In order to further illustrate the above procedures, the following examples are cited, which should not, however, be considered as limiting:

*Example I*

In a reactor similar to that shown in Figures 2, 0.68 pound per hour of ethylene oxide and 0.76 pound per hour of methyl mercaptan are admixed and passed into the bottom of the reactor at about 30° C. The reactor is about 1.0 inch in diameter and 8 feet in length, and is surrounded by a water jacket. The interior is packed with glass Raschig rings. At the start of the reaction, the reactor is filled with 2-methylmercapto-ethanol. Under these conditions, it is found that a temperature gradient is established within the column which is easily controlled by circulating cool water in the jacket. The reaction under the conditions set forth is initiated at about 40–50° C. in a section of the reactor where the concentration gradient of 2-methylmercapto-ethanol ranges from about 20–30% by weight. The product removed at the top of the reactor is found to consist of 2-methylmercapto-ethanol in substantially quantitative yields and about 95% purity. By re-distillation a product of over 99% purity is obtained.

*Example II*

In the same reactor employed in Example I an equimol mixture of ethylene oxide and ethyl mercaptan is mixed with approximately its own weight of 2-methylmercapto-ethanol and the mixture is introduced at about 20° C. into the bottom of the reactor at the rate of about 2.0 pounds per hour. No temperature control means are employed. A temperature gradient up the column, ranging from 30° to about 90° C. is observed. The product removed is about 96% pure, and by redistillation gave a product boiling at 184° C. and analyzing substantially 100% pure.

While the above examples show the reaction of ethylene oxide with ethyl and methylmercaptan, it is clear that other alkylene oxides and other mercaptans may be employed in a substantially identical manner by simply substituting the appropriate molar ratios. Suitable alkylene oxides include for example propylene oxide, 1,2-butylene oxide, 2,3-butylene oxide, isobutylene oxide, 1,2-amylene oxide, styrene oxide, cyclohexyl ethylene oxide, cyclohexene oxide, isoprene oxide, etc. Substituted alkylene oxides may also be employed e. g. 1-chloro-2,3-butylene oxide, 1-hydroxy-3,4-butylene oxide, p-chloro styrene oxide, p-amino styrene oxide etc. A preferred class of oxide consists of ethylene oxide and hydrocarbon-substituted ethylene oxides.

Suitable thiols include for example methyl-, ethyl-, n-propyl-, isopropyl-, n-butyl-, sec-butyl-, tert-butyl-, amyl- and hexyl-mercaptans, as well as higher straight and branched-chain aliphatic mercaptans. Other suitable thiols include thiophenol, benzyl mercaptans, p-methyl thiophenol, p-chloro thiophenol, 2-methoxy ethyl mercaptan, 2-hydroxy ethyl mercaptan, 2-mercapto-ethyl sulfide ($C_2H_5SC_2H_5SH$), 2-hydroxy-2'-mercapto-ethyl sulfide ($OHC_2H_5SC_2H_5SH$), ethylene di-thiol ($SHC_2H_5SH$) etc. In general any organic compound containing one or more mercaptan groups may be employed. A preferred group of thiols consists of the lower alkyl mercaptans. In cases where the thiol contains more than one mercaptan group, either polythio ethers or monothio ethers may be produced, depending upon the molar proportion of alkylene oxide employed.

In employing asymmetric alkylene oxides such as propylene oxide, two isomeric thio-ether products are theoretically possible as shown by the following equation:

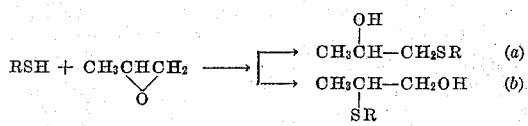

In general, it is found that a mixture containing products of both types (*a*) and (*b*) is produced, which mixture may either be utilized as such, or separated by conventional methods to obtain the desired isomer.

From the foregoing description it is clear that the methods described herein provide a remarkably efficient and easily controlled method for preparing a wide variety of hydroxy thio-ethers. The above disclosure, however, is not intended to include all details such as will occur to those skilled in the art, and the description should therefore not be considered as limiting in scope. The true scope of the invention is intended to be embraced by the following claims.

I claim:

1. A process for preparing a hydroxy thio-ether which comprises initiating a reaction between an alkylene oxide and an organic thiol at a temperature below about 70° C. in the presence of at least about 10% by weight of a hydroxy thio-ether, and in the absence of extraneous catalytic materials, and thereafter continuing said reaction to substantial completion at temperatures between about 50° and 100° C.

2. A process according to claim 1 wherein said first-named hydroxy thio-ether is identical to said last-named hydroxy thio-ether.

3. A process according to claim 1 wherein said alkylene oxide is ethylene oxide and said organic thiol is a lower alkyl mercaptan.

4. A process for preparing a hydroxy thio-ether which comprises initiating a reaction between an alkylene oxide and an organic thiol at a temperature below about 70° C. in the presence of at least about 40% by weight of a hydroxy thio-ether, and in the absence of extraneous catalytic materials, and thereafter continuing said reaction to substantial completion under substantially adiabatic conditions.

5. A process according to claim 4 wherein said first-named hydroxy thio-ether is identical to said last-named hydroxy thio-ether.

6. A process according to claim 4 wherein said alkylene oxide is ethylene oxide and said organic thiol is a lower alkyl mercaptan.

7. A continuous process for preparing a hydroxy thio-ether which comprises flowing an approximately equi-mol mixture of an alkylene oxide and an organic thiol both in liquid phase through an elongated reactor, maintaining upstreamwardly in said reactor a reaction-initiating zone characterized by (1) the presence of a substantial, catalytically effective proportion of said hydroxy thio-ether, (2) the absence of extraneous catalytic materials, and (3) a temperature of between about 20° and 70° C., maintaining downstreamwardly in said reactor a reaction completion zone characterized by the presence of an increasing ratio of said hydroxy thio-ether and by a temperature of between about 50° and 100° C., and continuously withdrawing hydroxy thio-ether from the outlet end of said reactor.

8. A process according to claim 7 wherein said alkylene oxide is ethylene oxide and said organic thiol is a lower alkyl mercaptan.

9. A process according to claim 7 including the step of recycling a portion of said hydroxy thio-ether from the outlet end of said reactor to the inlet thereof in admixture with said alkylene oxide and said organic thiol.

10. A continuous process for preparing a hydroxy thio-ether which comprises flowing an approximately equi-mol mixture of an alkylene oxide and an organic thiol both in liquid phase through an elongated reactor divided into tortuous passages, maintaining upstreamwardly in said reactor a reaction initiating zone characterized by (1) the presence of a substantial, catalytically effective proportion of said hydroxy thio-ether, (2) the absence of extraneous catalytic materials, and (3) a temperature of between about 20° and 70° C., maintaining downstreamwardly in said reactor a reaction completion zone characterized by an increasing ratio of said hydroxy thio-ether, and by a temperature of between about 50° and 100° C., and continuously withdrawing hydroxy thio-ether from the outlet end of said reactor at a rate sufficient to automatically maintain said catalytically effective proportion of hydroxy thio-ether in said reaction-initiating zone by mutual diffusion and intermixing of said incoming reactants with said produced hydroxy thio-ether.

11. A process according to claim 10 wherein said reactor is operated adiabatically.

12. A process according to claim 10 wherein said alkylene oxide is ethylene oxide and said organic thiol is a lower alkyl mercaptan.

13. In a process for preparing a hydroxy thio-ether by reacting a liquid organic thiol with a liquid alkylene oxide at a temperature sufficient to generate exothermic heat but insufficient to cause significant polymerization of said alkylene oxide, the improvement which comprises initiating said reaction in the presence of a substantial, catalytically effective proportion of a hydroxy thio-ether, and in the absence of extraneous catalytic materials.

14. A process as defined in claim 13 wherein said first-named hydroxy thio-ether is identical to said last-named hydroxy thio-ether.

References Cited in the file of this patent
UNITED STATES PATENTS

| 2,035,121 | Frolich | Mar. 24, 1936 |
| 2,205,021 | Schuette et al. | June 18, 1940 |
| 2,586,767 | Wilson | Feb. 19, 1952 |